United States Patent [19]

Kling

[11] Patent Number: 5,015,140

[45] Date of Patent: May 14, 1991

[54] SHUTTLE GUIDE FOR A STORAGE AND RETRIEVAL MACHINE

[75] Inventor: David A. Kling, Richfield, Wis.

[73] Assignee: Harnischfeger Engineers, Inc., Brookfield, Wis.

[21] Appl. No.: 411,293

[22] Filed: Sep. 22, 1989

[51] Int. Cl.$^5$ .............................................. B65G 1/00
[52] U.S. Cl. ...................................... 414/282; 414/663
[58] Field of Search ............... 414/277, 279, 280, 281, 414/282, 283, 659, 660, 663

[56] References Cited

U.S. PATENT DOCUMENTS

| | | | |
|---|---|---|---|
| 3,283,924 | 11/1966 | Chasar | 414/282 |
| 4,388,033 | 6/1983 | Pipes | 414/282 |
| 4,595,332 | 6/1986 | Loomer | 414/282 X |

FOREIGN PATENT DOCUMENTS

| | | | |
|---|---|---|---|
| 161704 | 12/1980 | Japan | 414/659 |
| 202503 | 8/1988 | Japan | 414/282 |

Primary Examiner—Joseph E. Valenza
Assistant Examiner—Keith L. Dixon

Attorney, Agent, or Firm—Richard C. Ruppin

[57] ABSTRACT

A shuttle guide for a shuttle of a storage and retrieval machine having a mast and a carriage on which the shuttle is mounted. The shuttle includes first and second plates movable relative to each other in directions transverse to the mast for carrying and depositing in or retrieving a load from a storage space. The shuttle guide comprises a first guide member having a downward facing straight guide surface extending in the transverse directions of movement of the plates and a second guide member having an upward facing inclined guide surface. The inclined guide surface is inclined upwardly relative to one of the transverse directions. A first guide roller is positioned in engagement with the straight guide surface and a second guide roller is positioned such that it is engageable with the inclined guide surface and guides one of the moveable plates in an upwardly inclined direction toward a storage space. Downward deflection of the first and second plates caused by the weight of the shuttle and the load is thereby counteracted.

5 Claims, 5 Drawing Sheets

SHUTTLE GUIDE FOR A STORAGE AND RETRIEVAL MACHINE

FIELD OF THE INVENTION

This invention relates to a guide for the shuttle of a storage and retrieval machine and, in particular, to a shuttle guide which guides the shuttle during its movement transverse to the mast of the storage and retrieval machine along a smooth path which has an upward or a downward inclination when the shuttle is respectively moving outward from or toward the storage and retrieval machine.

BACKGROUND OF THE INVENTION

Storage and retrieval machines are commonly used in material and inventory storage facilities for storing items in and retrieving the items from the facilities. Typical of such facilities are warehouses having storage racks of substantial height arranged along aisles in which the storage and retrieval machines travel to various designated aisle locations. The machines are self-propelled by electric drive motors and provided with signals from a remote source to direct them to each aisle location.

At each designated aisle location, there are a number of storage racks arranged in a vertically stacked manner. Each storage rack is typically suitable for holding a single box, pallet, or other items. The storage and retrieval machine inserts items into or retrieves items from each rack by moving a carriage along a vertical mast opposite the vertically stacked racks to a position opposite a designated rack and, by means of a shuttle, moving an object to be stored into the rack or retrieving an object to be moved elsewhere from the rack. A shuttle typically comprises several plates, a base or first one of which is affixed to the carriage. The balance of the plates are extendable from the carriage in a telescoping fashion into a bottom area of the rack space to transfer the box or pallet from the carriage to the rack or remove the box or pallet from the rack and on to the carriage.

The telescopically extendible plates are supported by multiple roller sections moveable in guide ways with either the roller sections or the guide ways for each plate being mounted on an immediately adjacent underlying plate. In extending from the carriage into the bottom area of the rack space or retracting from the rack space to the carriage, the clearance between the guide rollers and the guide ways, along with deflection caused by the weight of the shuttle, causes the shuttle to deflect below the theoretical straight line extension. The amount of deflection increases when a load object is on the shuttle. The historical method to compensate for the difference in deflection, loaded versus unloaded, has been to increase the distance the shuttle is lifted above the rack elevation at which the load is placed. Increasing the distance the shuttle is lifted requires increasing the rack clearance above the load object, thus increasing the space required to store the object. This additional vertical space is required for each vertically stacked rack space to thereby substantially increase the height of the entire rack or result in less rack spaces. To eliminate this wasted space problem, shuttle guide mechanisms have been developed which move the extended plates upward at an angle to deposit or pick up a load object and correspondingly move the extended plates downward to retract a load object from a rack. The present invention is an improvement in this type of shuttle guide for storage and retrieval machines.

SUMMARY OF THE INVENTION

It is an object of this invention to provide a guide for the shuttle of a storage and retrieval machine which guides the shuttle along an inclined and smooth extending and retracting path during an object retrieving or depositing operation of the shuttle.

The invention is accomplished by providing a storage and retrieval machine having a shuttle mounted on a carriage movable on a mast for carrying objects to and from overhead storage spaces. The mast is mounted on a base and the mast and base are travelable to designated locations. The shuttle comprises plate means supported on the carriage including first and second plates movable relative to each other in opposite transverse directions relative to the mast for depositing load objects in and retrieving the objects from the storage spaces. As the plate means move outward from the mast and toward a storage space, the weight of the shuttle and any load object carried by the plate means will cause downward deflection of the plate means. The plate means and thereby the shuttle are guided toward and away from the storage rack spaces by a first guide member having a downward facing straight guide surface extending in the transverse directions of movement of the plate means and by a second guide member having an upward facing inclined guide surface with the inclined guide surface being inclined upwardly relative to one of the transverse directions. A first guide roller means is positioned in engagement with the straight guide means and a second guide roller means is positioned such that it is engageable with the inclined guide surface and guides one of the moveable plates in an upward inclination direction toward a storage space. Thereby downward deflection of the plate means caused by the weight of the shuttle and the load is counteracted.

The upward facing surface of the second guide member may comprise a middle portion and an end raised portion, with an inclined ramp connecting the middle and raised end portions. The first and second guide roller means may comprise a plurality of spaced apart guide rollers with a first portion of the guide rollers being positioned intermediate a second portion of the guide rollers and the first portion of the guide rollers being spaced from the middle portion of the upward facing guide surface.

During the movement of the first and second plates in transverse extending and retracting directions, one of the intermediate guide rollers moves from a position engaging the raised end portion of the guide surface to a position at which it disengages from and engages with the upward facing guide surface during the transverse movement of the one intermediate plates. At the disengaging and engaging position of the one intermediate guide roller, another of the intermediate guide rollers has a position in supporting engagement with the inclined ramp such that the height of the one intermediate guide roller at its two positions is substantially the same. Thus, the movement of the guide rollers from engagement with the guide surfaces thereby the corresponding extension and retracting movement of the plate means is smooth and without any significant abrupt dip or jogging movement.

BRIEF DESCRIPTION OF THE DRAWINGS

Further objects and advantages will appear when taken in conjunction with the accompanying drawings, in which:

FIG. 4 is an end elevation view, partially broken away, of the shuttle shown in FIG. 3;

DETAILED DESCRIPTION OF THE INVENTION

Figure 1:
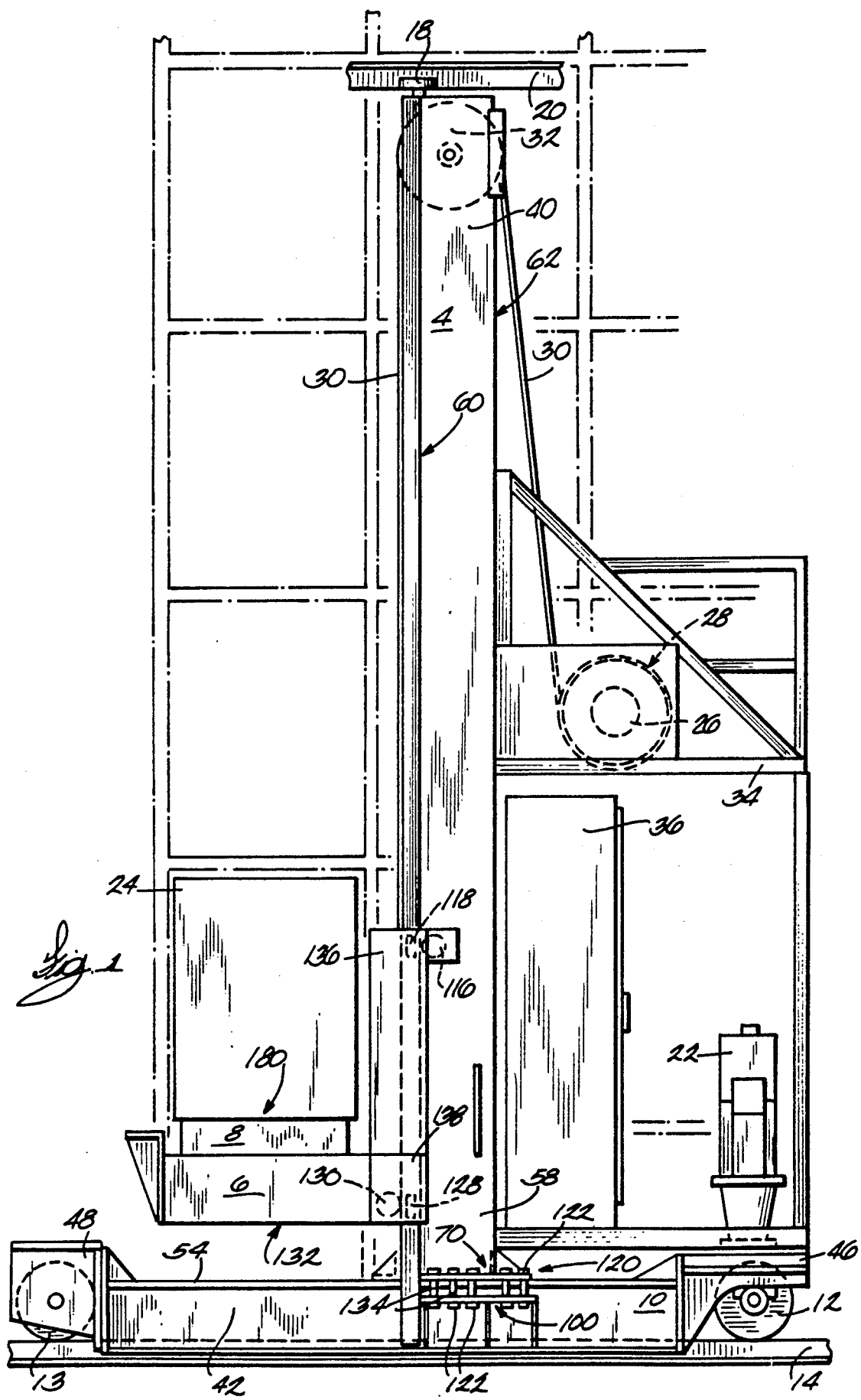
FIG. 1 is a side elevation view of a storage and retrieval machine utilizing a guide for a shuttle according to the invention.
Figure 2:
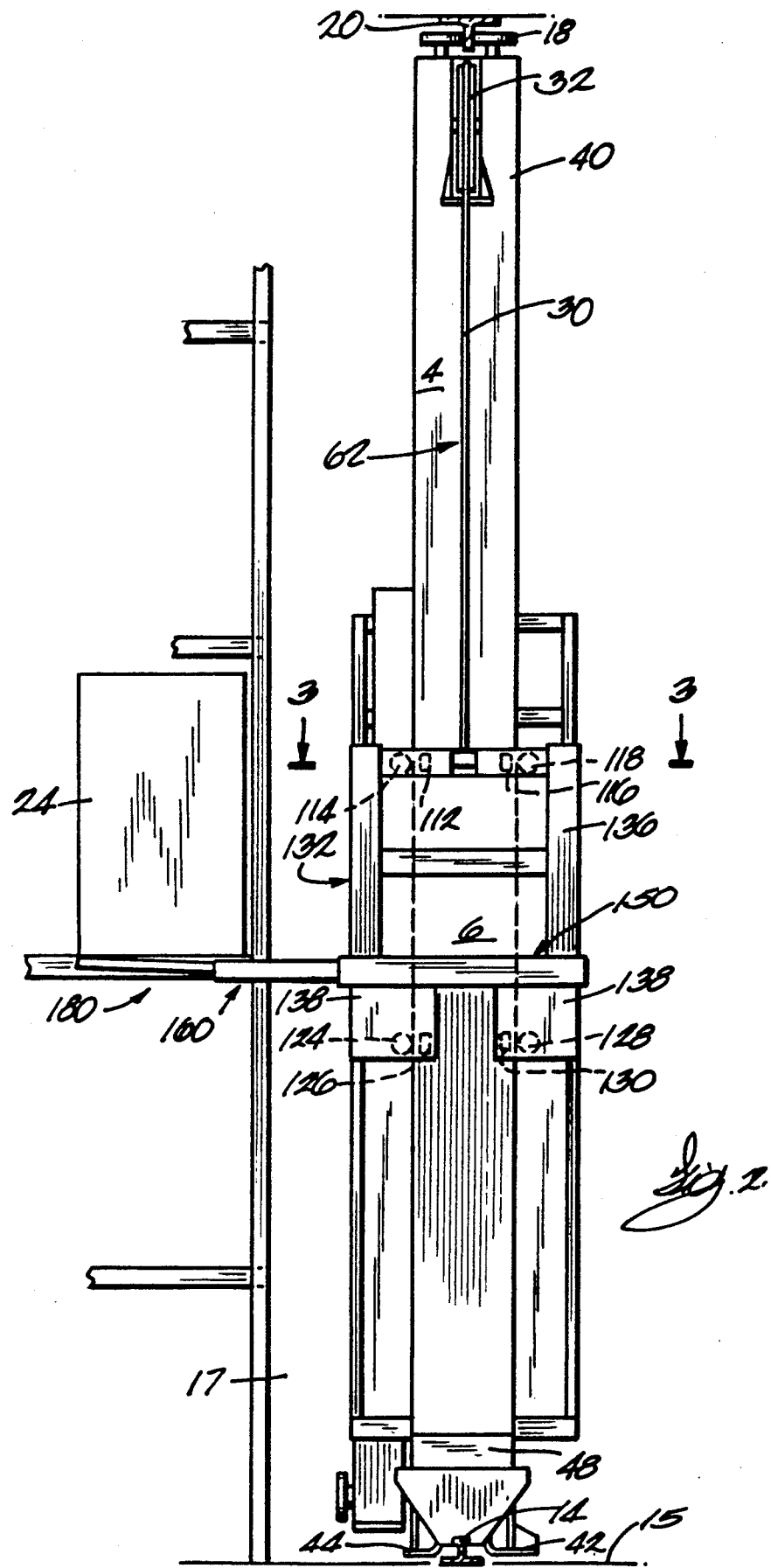
FIG. 2 is a front end elevation view of the storage and retrieval machine shown in FIG. 1 with the shuttle extended into a storage rack.

Referring generally to FIGS. 1 and 2 of the drawings, a storage and retrieval machine is shown having a base 2, a mast 4 mounted on and extending upwardly from the base 2, a mast connecting structure 10 for connecting the mast to the base, a carriage 6 movable along the length of the mast 4 to selected vertical positions, and a shuttle 8 mounted on the carriage 6. A front wheel 13 and a rear wheel 12 are mounted on the base 2 and roll along a rail 14 supported on a foundation 15 and running through an aisle path 17 in a storage area such as a warehouse having stacked storage racks 16. Upper guide wheels 18 mounted on the upper 40 of the mast 4 engage an upper guide rail 20 to guide the storage and retrieval machine along the rail 14 and maintain the machine in an upright position. A motor 22 mounted on the base 2 drives the rear wheel 12 so that the storage and retrieval machine travels along the rail 14 to selected locations in the aisle path 17 adjacent to the stacked storage racks 16.

At each selected aisle location of the storage and retrieval machine the carriage 6 is driven in vertical directions to a selected one of the storage racks 16 where the shuttle 8 is driven in directions transverse to the mast 4 into the selected storage rack 16 to deliver or retrieve a load object such as box 24 shown in FIGS. 1 and 2. At a position in the rack underneath the load, the movement of the shuttle includes an upward component when extending into the rack to pick up the load, and includes a downward component when retracting from the rack to deposit the load in the rack. The carriage 6 is driven by a motor 26 acting through a rope drum assembly 28, both mounted on a frame 34 affixed to the base 2 and the mast 4, and driving a rope 30 connected to the carriage 6 and wrapped around a sheave 32. A control 36 is also mounted on the base 2 for controlling the operation and movement to the selected locations of the base 2, the carriage 6 and the shuttle 8. Suitable means (not shown) are provided for supplying electrical power to the motors mounted on the base and carriage and control signals to the control 36.

The base 2 comprises two lengthwise parallel spaced apart L-shaped members 42 and 44 and a top plate 54 which extends along a substantial middle portion of the length of the base 2 and is affixed to the members 42 and 44 by suitable means such as welding. The base 2 also includes end trucks 46 and 48 attached to opposite ends of the members 42 and 44. The wheels 12 and 13 are respectively mounted on the trucks 46 and 48. The mast 4 comprises an elongated tube 60 having a rectangular cross-section and an additional elongated member 62 affixed along its length to the tube 60. The tube 60 has a front wall 50, a rear wall 52, a lateral wall 56 and a lateral wall 64. In addition to the upper end 40, the mast 4 has a lower end 58 supported by the mast connecting structure 10.

The mast connecting structure 10 includes an upper plate means 70, a lower plate means 100, and connecting means 120 connecting the plate means 70 and 100 together. The upper plate means 70 is affixed to the mast 4 and the lower plate means 100 is affixed to the base 2. The connecting means 120 includes a plurality of nut and bolt means 122 for connecting the upper and lower plate means 70 and 100 and thereby mounting the mast 4 on the base 2. A plurality of support tubes 134 are positioned coaxially on the bolt means 122, The bolt means 122 draw the upper plate means 70, against the support of the tubes 134, toward the lower plate means 100 upon the tightening of the bolt means to connect the mast to the base.

Figure 3:
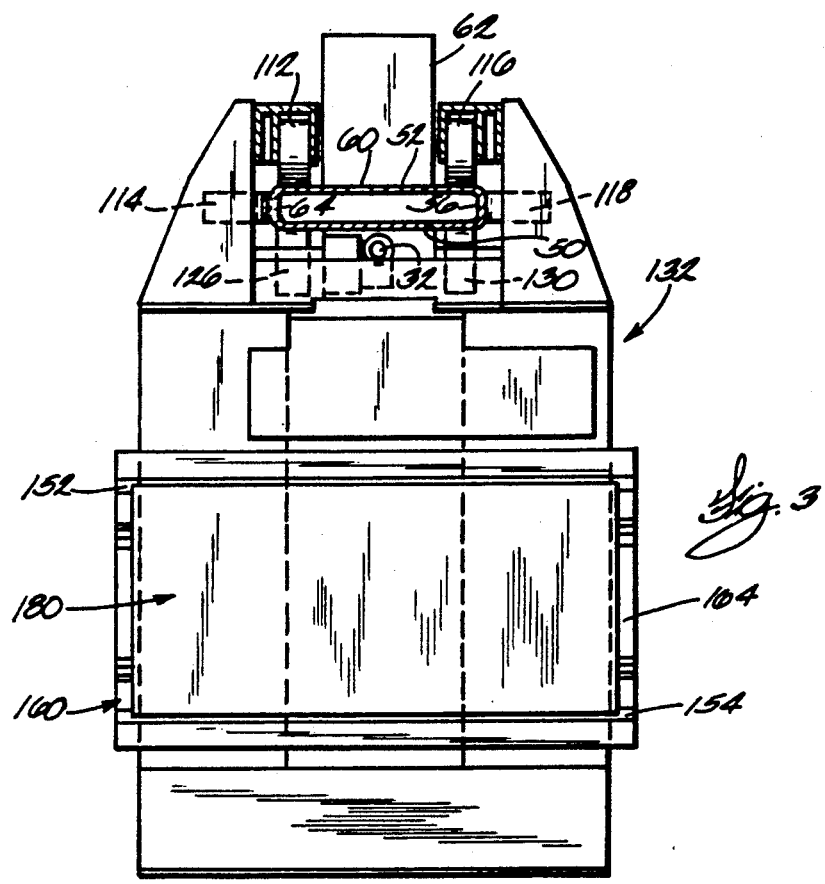
FIG. 3 is a cross-sectional plan view, partially broken away, taken along lines 3—3 of FIG. 2 and illustrating the shuttle.

With reference to FIGS. 1-3, the carriage 6 includes a frame 132 upon which the shuttle 8 is mounted and to which is connected the rope 30 for moving the carriage 6 vertically along the mast 4 in response to the operation of the motor 26 and rope drum assembly 28. The carriage 6 is movably supported on the mast 4 by means of upper support rollers 112, 114, and 116, 118 rotatably mounted on an upper section 136 of the frame 132, and by means of lower support rollers 124, 126 and 128, 130 mounted on a lower section 138 of the frame 132. The rollers 114, 124, and 118, 128 respectively engage the lateral walls 64 and 56 of the tube 60, the rollers 112, 116 both engage the wall 52 of the tube 60, and the rollers 126, 130, both engage the wall 50 of the tube 60.

Figure 5:
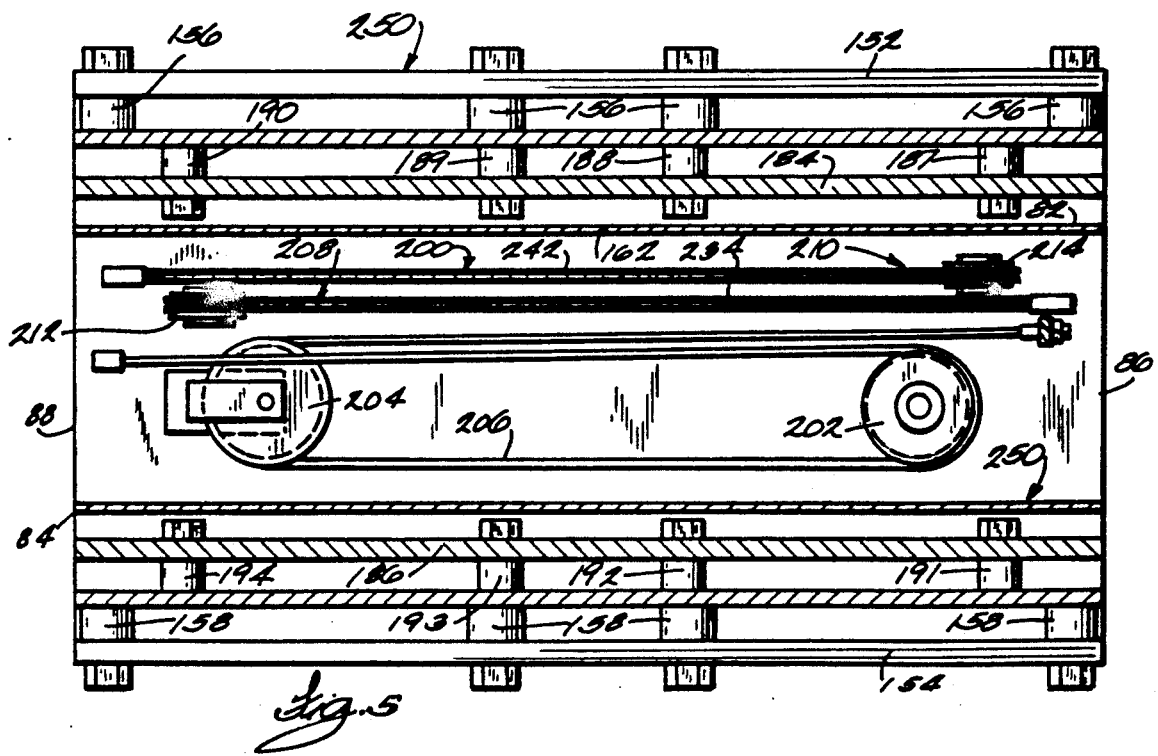
FIG. 5 is a cross-sectional plan view, partially broken away, taken along lines 5—5 of FIG. 4.
Figure 6:
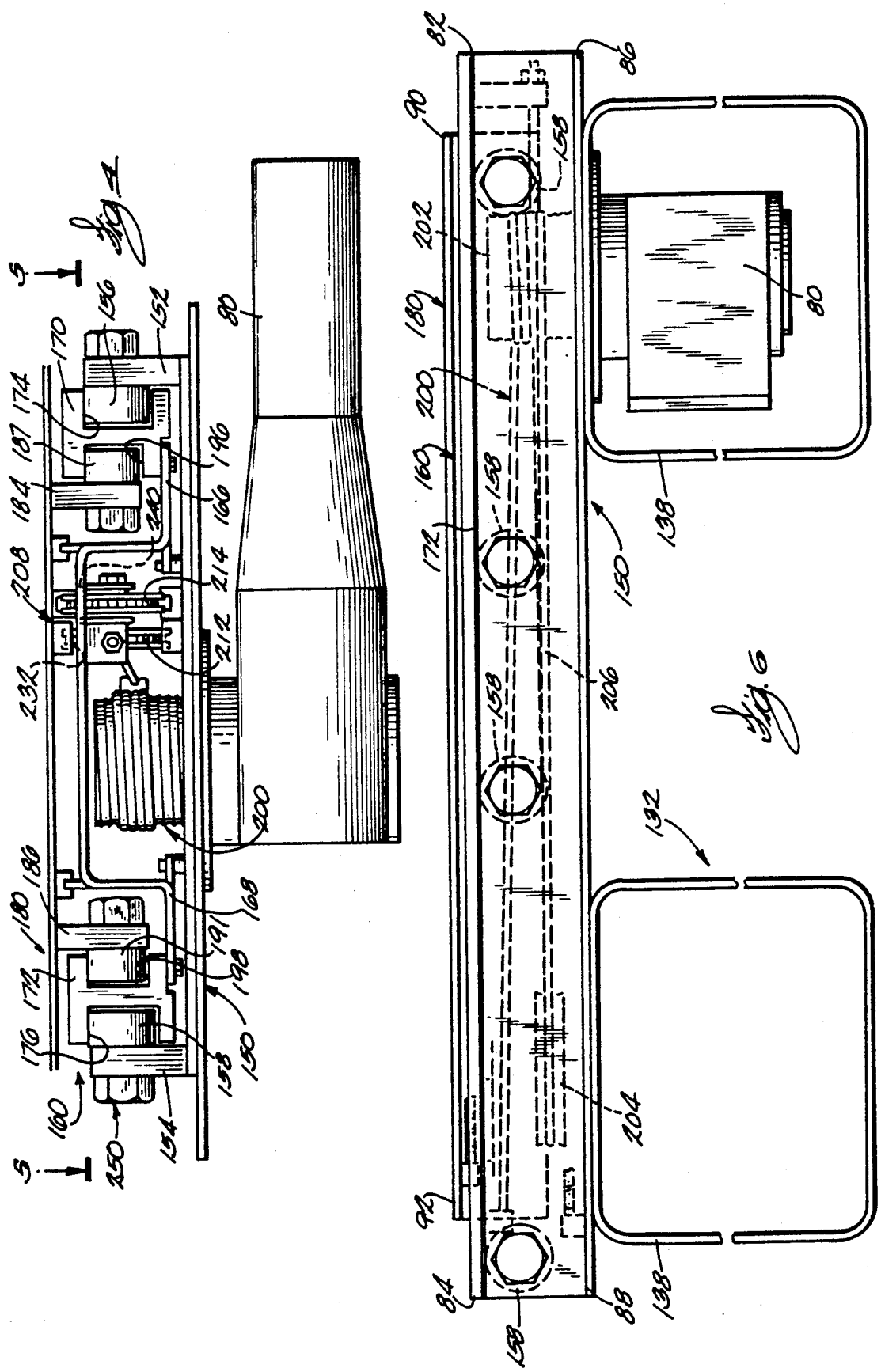
FIG. 6 is a side-elevation view of the shuttle shown in FIG. 4.

Referring to FIGS. 4-6, the shuttle 8 comprises a motor and gear drive 80 mounted on the lower section 138 of the carriage frame 132, a shuttle drive 200, a lower base plate 150, an intermediate plate 160, a top plate 180, and a shuttle guide assembly 250. The shuttle guide assembly 250 includes side support walls 152 and 154 mounted on base plate 150, side support walls 184 and 186 projecting downwardly from top plate 180, guide tracks 170 and 172 mounted on the lateral edge sections 166 and 168 of intermediate plate 160, first support guide rollers 156 and 158 respectively rotatably mounted on walls 152 and 154 of base plate 150, and second support guide rollers 187, 188, 189, 190 and 191, 192, 193, 194 respectively rotatably mounted on walls 184 and 186 of top plate 180.

The base plate 150 is affixed to the lower frame sections 138 of the carriage frame 132. The intermediate plate 160 is supported for movement transverse of the mast 4 on the support walls 152 and 154 by the projection into and engagement of the rollers 156 and 158 respectively with the guide ways 174 and 176 of the respective guide tracks 170 and 172. The top plate 180 is supported for movement transverse of the mast 4 on the walls 184 and 186 by the projection into and engagement of the rollers 187-190 and 191-194 with the guide ways 196 and 198 of the respective guide tracks 170 and 172.

The shuttle drive 200 includes a drive drum 202 and an idler sheave 204 mounted for rotation on the base plate 150, a cable 206, and drive chain means 208 and 210. The cable 206 is wrapped around the drive drum 202 and the idler sheave 204 and is attached to the intermediate plate 160 at opposite ends 82 and 84 of the plate 160. The drive drum 202 is selectively rotatably driven in opposite rotational directions by the gear and motor drive 80. The drive chain means 208 includes a rotatable sprocket 212 rotatably mounted on the intermediate plate 160 and projecting through a slot 232 in the plate means 160. A roller chain 234 wraps around the sprocket 212 and attaches to the base plate 150 at the end 86 of the base plate and to the top plate 180 at the end 90 of the top plate. The drive chain means 210 has a sprocket 214 rotatably mounted on the intermediate plate 160 at the end 82 of the plate 160 which projects through a slot 240 in the plate means 160. A roller chain 242 wraps around the sprocket 214 and attaches to the base plate 150 at the end 88 of the base plate and to the end 92 of the top plate 180.

In the operation of the shuttle 8, the intermediate plate 160 is extended transversely away from the mast 4 along the guide tracks 170 and 172 from its retracted position shown in FIG. 6 by rotation of drive drum 202 in a first direction such that the cable 206 pulls the plate 160 in a direction away from the carriage 6. As the intermediate plate 160 is moved in a direction away from the carriage 6 by the operation of drum 202 and cable 206, the sprocket 212 also moves away from the carriage 6. Since the chain 234 is attached to the base plate 150, which is stationarily mounted on the carriage 6, the sprocket 212 will rotate and pull the chain 234 in an outwardly direction to thereby also move the top plate 180 along the guide tracks 170 and 172 outwardly away from the carriage 6 and in a direction transverse to the mast 4. The shuttle 8 is thereby extended from the carriage 6 to the extended position shown in FIG. 2. When the drive drum 202 is rotated in a second direction opposite to the first rotation direction, the cable 206 pulls the intermediate plate 160 toward the carriage 6. The sprocket 214, which is mounted on the intermediate plate 160, moves toward the carriage 6 with the intermediate plate 160 and is rotated so that the chain 242 pulls the top plate 180 toward the carriage 6 in a direction transverse to the mast 4 along the guide tracks 170 and 172. The shuttle 8 is thereby returned to its retracted position in which the plates 160 and 180 are both in their positions on the carriage 6 as shown in FIG. 4.

With reference to FIGS. 7-11, the positions of the rollers 191-194 and 187-190 are illustrated relative to the guide track, relative to the guide tracks 172 and 170 as the shuttle 8 is moved transversely outward from and toward the mast 4 and extended into and retracted from a rack 16. Since the guide rollers 187-190 move through positions in guide way 196 of track 170 corresponding to those of rollers 191-194 in guide way 198 of track 172 as the shuttle 8 is extended and retracted, only the track 172 and the movement and positions of rollers 191-194 will be described in detail herein. The guide way 198 of the track 172 includes a vertical wall 216, an upper guide surface 218 which preferably has a straight length, and a lower guide surface 220. The lower guide surface 220 includes inclined portions 222 and 224 respectively adjacent the ends 226 and 228 of the guide way 198, a straight middle portion 230 adjoining the inclined portions 222 and 224 and which is not inclined relative to the portions 222 and 224, and may also include straight end portions 236 and 238 respectively immediately adjacent the ends 226 and 228 of the guide way 198. The end portions 236 and 238 may be parallel to the middle portions 222 and 224. The support guide rollers 191-194 project into the guide way 198 as shown in FIGS. 4 and 5 and engage the guide way 198 to support the top plate 180.

Figure 7:
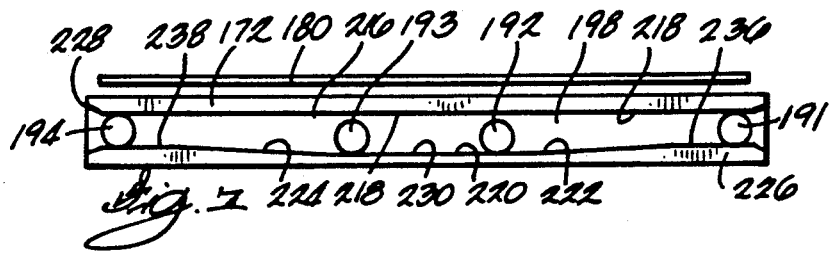
FIGS. 7-11 are schematic side elevation cross-sectional views, similar to the view of FIG. 6, illustrating the shuttle in five different positions during its extending and retracting operation.
Figure 8:

In the retracted position of the shuttle 8 as shown in FIGS. 6 and 7, in which the plates 180 and 160 overlie the plate 150 and are centered on the carriage relative to the view of FIG. 6, the spaced apart end rollers 191 and 194 engage the upper guide surface 218 and are respectively positioned just inwardly of the narrow exit ends 226 and 228 of the guide way 198. The middle rollers 192 and 193, located intermediate the rollers 191 and 194, engage the middle portion 230 of the lower guide surface 220 and are spaced from the upper guide surface 218. In this first or retracted position of the shuttle 8, the top plate 180 desirably has a horizontal position. As the top plate 180 is moved by the shuttle drive means 200 transversely away from the mast 4 and towards a stack space 16, the support guide roller 191 exits from the narrow exit end 226 of the guide way 198, as shown in FIG. 8. This movement also results in the roller 192 beginning movement up the inclined portion 222 of the lower guide surface 220 which causes the roller 193 to be lifted off of the middle portion 230 of the lower guide surface, also as shown in FIG. 8. The shuttle, is now in a second position, slightly extended transversely of the mast 4 from the carriage 6 and supported by the roller 192 engaging the inclined surface 222 and the roller 194 engaging the upper guide surface 218. The top plate 180 is slightly inclined upwardly in the direction of a stack space.

Figure 9:
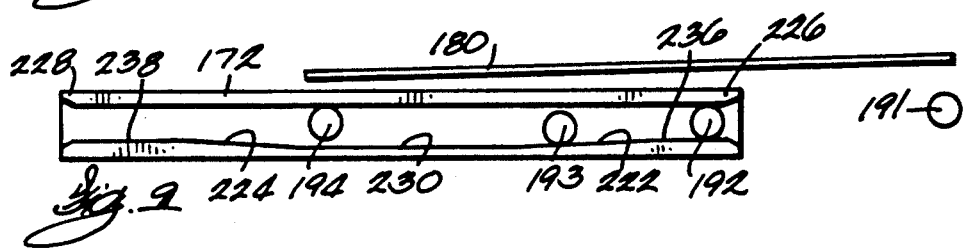

Continued extension of the top plate 180 transversely from the mast 4 toward a storage rack 16 moves the support guide rollers 191-194 to their positions shown in FIG. 9 in which roller 191 is well away from the guide way 198, the middle roller 192 has moved upward on the inclined portion 222 of the lower guide surface 220 and is in the narrow end 226 of the guide way, middle roller 193 has moved upward slightly on the inclined portion 222, and roller 194 continues to engage upper guide surface 218. Due to the upward movement of the roller 193 on the inclined portion 222, the roller 193 starts to carry some of the load of the shuttle. As the roller 193 moves upward on inclined portion 222, it may also lift the roller 192 a small distance preferably no greater than the clearance space between the roller 192 and the upper guide surface 218. In order to enable the slight lifting of the roller 192 to assist with the assumption the shuttle load by the roller, the distance between the rollers 192 and 193 must be such that the movement of the roller 193 along the inclined portion 222 will not lift the roller 192 more than the clearance space between the roller 192 and the surface 218 prior to the exiting of roller 192 from the narrow end 236. In the position of the shuttle as shown in FIG. 9, the load of the shuttle is carried substantially by rollers 194 and 193 and the inclination of the top plate 180 has increased due to the movement of the roller 192 further upward on the inclined portion 222 and the beginning of the upward movement on the inclined portion of the roller 193.

Figure 10:

In FIG. 10, the rollers 191-194 and the guide way 198 are shown in a fourth position of the shuttle in which roller 192 has exited the narrow end 236 of the guide way 198 and is out of engagement but adjacent to the end 236. The roller 193 has moved further up the inclined portion 222 of the lower guide surface 220. Because the roller 193 assumes all or at least a substantial portion of the weight of the load of the shuttle prior to the exiting of the roller 192 from the narrow end 236, the exiting of the roller 192 from the end 236 will be smooth and without any substantial dip or abrupt changes in its path, that is, the height of the roller 192 will be substantially the same at its engaged position with guide way end 236 and at its exiting, disengaged position with guide way end 236. The load of the shuttle is carried by the rollers 194 and 193 and the top plate 180 is further inclined.

Figure 11:
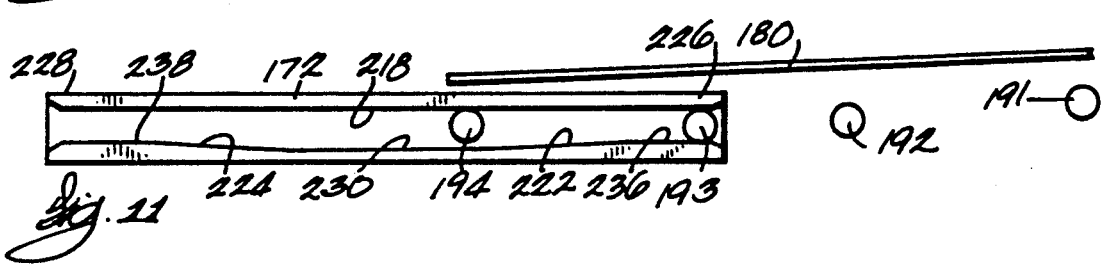

In FIG. 11, the position of the rollers 191-194 and the guide way 198 are shown in a fifth position of the shuttle in which the roller 192 is well away from the guide way 198 and the roller 193 is positioned in engagement with the guide way 198 in the narrow end 236. The load of the shuttle continues to be supported by the rollers 194 and 193 and the plate 180 is inclined to its maximum inclined position in a bottom area of a storage rack 16 and in engagement with a load such as a box 24 in the rack 16, as shown in FIG. 2.

In moving in a transverse direction toward the mast 4 and retracting from a storage rack the shuttle and its rollers 191-194 move through the positions substantially as shown in FIGS. 7-11 as described above in a reverse order. At the position shown in FIG. 10, the roller 192 will be adjacent to but disengaged from the end 226 of the guide way and will engage and enter the end 226 in a smooth manner as it moves to the position shown in FIG. 9.

The movement upward of the plate 180 in the rack space beneath the box 24 results in a lifting of the box 24 sufficient to disengage it from the rack 16 upon retraction of the shuttle to thereby enable the retrieval of the box 24 on the plate 180 from the storage rack 16. In the retraction of the shuttle from the storage rack 16 the plate 180 and thereby the rollers 191 and 192 may have a relatively greater downward deflection due to the load of the box 24 in addition to the load of the shuttle itself. However, the path of the rollers 192 and 191 adjacent the narrow end 236 of the guide way 198 will be substantially the same as their position during extension of the shuttle.

It will be understood that the foregoing description of the present invention is for purposes of illustration only and that the invention is susceptible to a number of modifications or changes none of which entail any departure from the spirit and scope of the present invention as defined in the hereto appended claims.

What is claimed is:

1. In a storage and retrieval machine having a base travelable to designated locations, a mast mounted on the base, carriage means movable in vertical directions on the mast for carrying objects to and from positions adjacent overhead storage spaces, a shuttle mounted on the carriage and including object support plate means having a first plate and a second plate movable relative to each other in opposite directions transverse to the mast toward and away from storage spaces for depositing in and retrieving load objects from the storage spaces, the load objects and the shuttle each having a weight causing deflection of the support plate means downward when the latter is extended toward a storage space, a shuttle guide comprising:

a first guide member having a downward facing straight guide surface extending in said transverse directions and mounted on the first plate;
first guide roller means mounted on the second plate in engagement with the straight guide surface;
a second guide member having an upward facing inclined guide surface including an upward facing end portion mounted on one of the first and second plates, the inclination of the inclined guide surface being upward in one of said transverse directions;
second guide roller means mounted on the other of the first and second plates, the second guide roller means being engageable with the inclined guide surface for inclining upwardly that plate of the first and second plates that moves toward a storage space whereby downward deflection of the support plate means caused by the weight of the shuttle and a load object is counteracted; and
the second guide roller means includes a first guide roller having a height and a first position in engagement with the second guide member at the end portion and a second position at which the first guide roller disengages from and engages with the end portion of the second guide member during said transverse movement of the first and second plates, the height of the first guide roller being substantially the same at the first and second positions.

2. In a storage and retrieval machine having a base travelable to designated locations, a mast mounted on the base, carriage means movable in vertical directions on the mast for carrying objects to and from positions adjacent overhead storage spaces, a shuttle mounted on the carriage and having plate means including a first plate and a second plate movable relative to the first plate in opposite directions transverse to the mast toward and away from storage spaces for depositing load objects in and retrieving the objects from the storage spaces, and objects and the shuttle each having a weight causing movement of the second plate downward when the latter is extended toward a storage space, a shuttle guide comprising:

a first downward facing straight guide surface and a second upward facing guide surface mounted on one of the first and second plates, the second upward facing guide surface having a middle portion and an end portion raised relative to the middle portion and including an upwardly inclined ramp extending away from the middle portion;
the second plate having a retracted position adjacent the first plate and an extended position inclined upwardly and extending away from the second plate in one of said transverse directions;
first guide roller means for supporting and moving the second plate relative to the first plate and having a first retracted position corresponding to the retracted position of the second plate and a second extended position corresponding to the extended and inclined position of the second plate, the first guide roller means including first, second and third guide rollers respectively, when the guide roller means is in its first retracted position, engaging the first guide surface, engaging the second guide surface, and engaging the second guide surface and spaced in one of said transverse directions from the second guide roller, the guide roller means when in its second extended position being in supporting engagement with the first guide surface and the raised end portion of the second guide surface; and the second guide roller has a height and is movable along the second guide surface to a non-load bearing second position in engagement with the raised end portion of the second guide surface and to a non-load bearing third position at which the second guide roller is disengaged from the second guide surface during said transverse movement of the second plate away from the mast, the third guide roller being movable along a load bearing second position on the inclined ramp of the second guide surface simultaneously with the movement of the second roller to its non-load bearing second and third positions such that the third roller supports the weight of the second plate and load object and the height of the second guide roller at its second and third positions is substantially the same whereby a dip in the second plate due to its deflection is avoided.

3. In a storage and retrieval machine having a base travelable to designated locations, a mast mounted on the base, carriage means movable in vertical direction on the mast for carrying objects to and from positions adjacent overhead storage spaces, a shuttle mounted on the carriage and having plate means including a first plate and a second plate movable relative to the first plate in opposite directions transverse to the mast toward and away from storage spaces for depositing load objects in and retrieving the objects from the storage spaces, the weight of the load object and the shuttle moving the second plate downward when the latter is extended toward a storage space, a shuttle guide comprising:

a guide way mounted on one of the first and second plates and having facing first and second guide surfaces and opposite ends, the second guide surface facing upward and having a lower middle surface position and an upwardly inclined end portion connected to the middle portion;

first and second spaced apart guide rollers mounted on the other of the first and second plates and having a position between the first and second guide surfaces, one of the first and second guide rollers having a position spaced from the guide way as a result of said transverse relative movement of the first and second plates;

third and fourth spaced apart guide rollers positioned intermediate the first and second guide rollers and at a lower level than the first and second guide rollers, one of the third and fourth guide rollers having a position spaced from the guide way as a result of said transverse relative movement of the first and second plates; and said one of the third and fourth guide rollers has a first guide way exit and entrance position at which said one of the third and fourth rollers disengages from and engages with the guide way during transverse relative movement of the first and second plates and the other of the third and fourth rollers simultaneously has a position on the inclined end portion of the second guide surface such that the height of said one of the third and fourth rollers disengaged from the guide way is substantially the same as its height in engagement with the guide way.

4. In a storage and retrieval machine having a base travelable to designated locations, a mast mounted on the base, carriage means movable in vertical directions on the mast for carrying objects to and from positions adjacent overhead storage spaces, a shuttle mounted on the carriage and including object support plate means having a first plate and a second plate movable relative to each other in opposite directions transverse to the mast toward and away from storage spaces for depositing in and retrieving load objects from the storage spaces, the load objects and the shuttle each having a weight causing deflection of the support plate means downward when the latter is extended toward a storage space, a shuttle guide comprising:

a first guide member having a downward facing straight guide surface extending in said transverse directions and mounted on the first plate;

first guide roller means mounted on the second plate in engagement with the straight guide surface;

a second guide member having an upward facing inclined guide surface including an upward facing end portion mounted on one of the first and second plates, the inclination of the inclined guide surface being upward in one of said transverse directions;

second guide roller means mounted on the other of the first and second plates, the second guide roller means being engageable with the inclined guide surface for inclining upwardly that plate of the first and second plates that moves toward a storage space whereby downward deflection of the support plate means caused by the weight of the shuttle and a load object is counteracted, the second guide roller means includes a first guide roller having a first position in engagement with the second guide member at the end portion and a second position at which the first guide roller disengages from and engages with the end portion of the second guide member during said transverse movement of the first and second plates;

the first and second positions of the first guide roller are non-load supporting positions of the first guide roller; and the second guide roller means includes a second guide roller spaced from the first guide roller in one of said transverse directions, the second guide roller being in load supporting engagement with the second guide member simultaneously with the first guide roller being in its first and second non-load supporting positions.

5. The shuttle guide according to claim 1 wherein the first guide roller has a third position at which it engages with the end portion of the second guide member during transverse movement of the second plate toward the first plate, the height of the first guide roller being substantially the same at the first and third positions.

* * * * *